US008230176B2

(12) United States Patent
Li

(10) Patent No.: US 8,230,176 B2
(45) Date of Patent: Jul. 24, 2012

(54) RECONFIGURABLE CACHE

(75) Inventor: Jian Li, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 12/492,659

(22) Filed: Jun. 26, 2009

(65) Prior Publication Data

US 2010/0332761 A1 Dec. 30, 2010

(51) Int. Cl.
*G06F 12/00* (2006.01)
*G06F 12/02* (2006.01)

(52) U.S. Cl. ................. 711/129; 711/131; 711/149

(58) Field of Classification Search .......... 711/129, 711/131, 149
See application file for complete search history.

(56) References Cited

U.S. PATENT DOCUMENTS

| | | | | |
|---|---|---|---|---|
| 5,465,344 A * | 11/1995 | Hirai et al. | ................. | 711/131 |
| 5,761,715 A * | 6/1998 | Takahashi | ................. | 711/128 |
| 6,392,954 B2 * | 5/2002 | Reddy et al. | ............ | 365/230.05 |
| 6,766,420 B2 * | 7/2004 | Rawson, III | ................. | 711/133 |
| 6,845,432 B2 * | 1/2005 | Maiyuran et al. | ............ | 711/154 |
| 6,965,969 B2 * | 11/2005 | Burger et al. | ................. | 711/128 |
| 7,020,001 B2 * | 3/2006 | Alexanian | ................. | 365/63 |
| 7,127,560 B2 * | 10/2006 | Cohen et al. | ................. | 711/141 |
| 7,437,513 B2 * | 10/2008 | Saida et al. | ................. | 711/128 |
| 7,606,976 B2 * | 10/2009 | Raghuvanshi | ................. | 711/118 |
| 7,647,514 B2 * | 1/2010 | Ishihara et al. | ............... | 713/320 |
| 2003/0145239 A1 * | 7/2003 | Kever et al. | ................. | 713/300 |
| 2007/0028120 A1 * | 2/2007 | Wysocki et al. | ............... | 713/192 |

OTHER PUBLICATIONS

Kim, Changkyu et al., "An Adaptive, Non-Uniform Cache Structure for Wire-Delay Dominated On-Chip Caches", 10th International Conference on Architectural Support for Programming Languages and Operating Systems (ASPLOS), Oct. 2002, pp. 211-222.

* cited by examiner

*Primary Examiner* — Sanjiv Shah
*Assistant Examiner* — Samuel Dillon
(74) *Attorney, Agent, or Firm* — Stephen R. Tkacs; Stephen J. Walder, Jr.; Libby Z. Toub

(57) ABSTRACT

A mechanism is provided for providing an improved reconfigurable cache. The mechanism partitions a large cache into inclusive cache regions with equal-ratio size or other coarse size increase. The cache controller includes an address decoder for the large cache with a large routing structure. The cache controller includes an additional address decoder for the small cache with a smaller routing structure. The additional address decoder for the small cache reduces decode, array access, and data return latencies. When only a small cache is actively in use, the rest of the cache can be turned into low-power mode to save power.

20 Claims, 5 Drawing Sheets

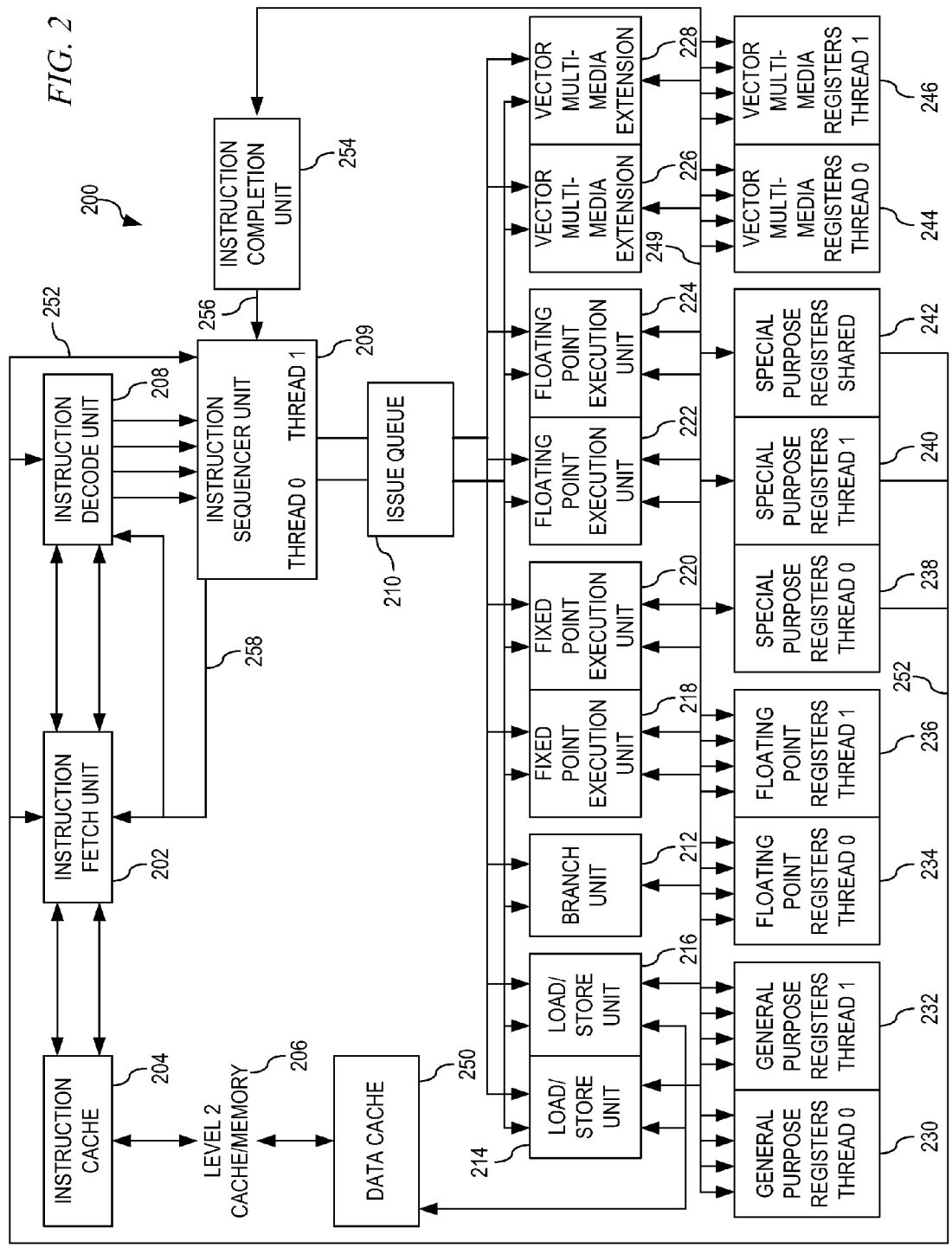

RECONFIGURABLE CACHE

BACKGROUND

The present application relates generally to an improved data processing apparatus and method and more specifically to an apparatus and method for providing an improved reconfigurable cache.

A cache is used to speed up data transfer and may be either temporary or permanent. Memory caches are in every computer to speed up instruction execution and data retrieval and updating. These temporary caches serve as staging areas, and their contents are constantly changing. A memory cache, or "CPU cache," is a memory bank that bridges main memory and the central processing unit (CPU). A memory cache is faster than main memory and allows instructions to be executed and data to be read and written at higher speed. Instructions and data are transferred from main memory to the cache in fixed blocks, known as cache "lines."

Non-uniform cache architecture (NUCA) is an emerging cache architecture for large cache design. In a NUCA, a single cache contains multiple banks of differing distance and, thus, differing wire delay and latency. NUCA improves performance of memory systems.

A large NUCA has many banks. Therefore, frequent data movement between banks may hurt performance and increase power consumption. Conventional reconfigurable caches mainly target for power reduction by using simpler (direct mapped) or partial cache. For example, an adaptive cache may configure between direct mapped cache and set-associative cache or may configure between two-way set associativity and four-way set associativity. Another form of adaptive cache uses one-way access to turn on only one way during a write to save power. While conventional reconfigurable and adaptive cache architectures and techniques are generally target power reduction, using conventional reconfigurable caches does not improve access latency.

SUMMARY

In one illustrative embodiment, a method, in a data processing system, is provided for reconfigurable cache size. The method comprises configuring a cache controller to use a first address decoder to access a first cache partition having a first size and responsive to an event, reconfiguring the cache controller to use a second address decoder to access a second cache partition having a second size.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, an apparatus is provided for reconfigurable cache size. The apparatus comprises a cache array and a cache controller. The cache array is partitioned into a first cache partition having a first size and a second cache partition having a second size. The cache controller is configured to use a first address decoder to access the first cache partition and responsive to an event. The cache controller is reconfigured to use a second address decoder to access the second cache partition.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and farther objectives and advantages thereof, will best be understood by reference to the following detailed description of illustrative embodiments when read in conjunction with the accompanying drawings, wherein:

FIG. 2 is an exemplary block diagram of a processor design in which aspects of the illustrative embodiments may be implemented;

DETAILED DESCRIPTION

The illustrative embodiments provide a mechanism for providing an improved reconfigurable cache. The mechanism partitions a large cache into inclusive cache regions with equal-ratio size increase. For example, the mechanism may partition an 8 MB L3 cache into a 1 MB L3 small cache and an 8 MB L3 large cache, where the 8 MB L3 large cache includes the 1 MB L3 small cache, which is close in physical proximity to the cache controller. The cache controller includes an address decoder for the large cache with a large routing structure. The cache controller includes an additional address decoder for the small cache with a smaller routing structure.

The cache controller may initially fill a predetermined small cache region using the additional address decoder. The cache controller then may use a miss counter to monitor miss rate to the cache. Based on the miss rate, a software hint, or run-time profile information, the cache controller may use the large cache size with its corresponding decoder. If the miss rate is not reduced by a predetermined amount, such as by half, the cache controller may flush affected cache lines and revert back to the small cache size with its corresponding decoder. The additional address decoder for the small cache reduces decode, array access, and data return latencies.

Figure 1:
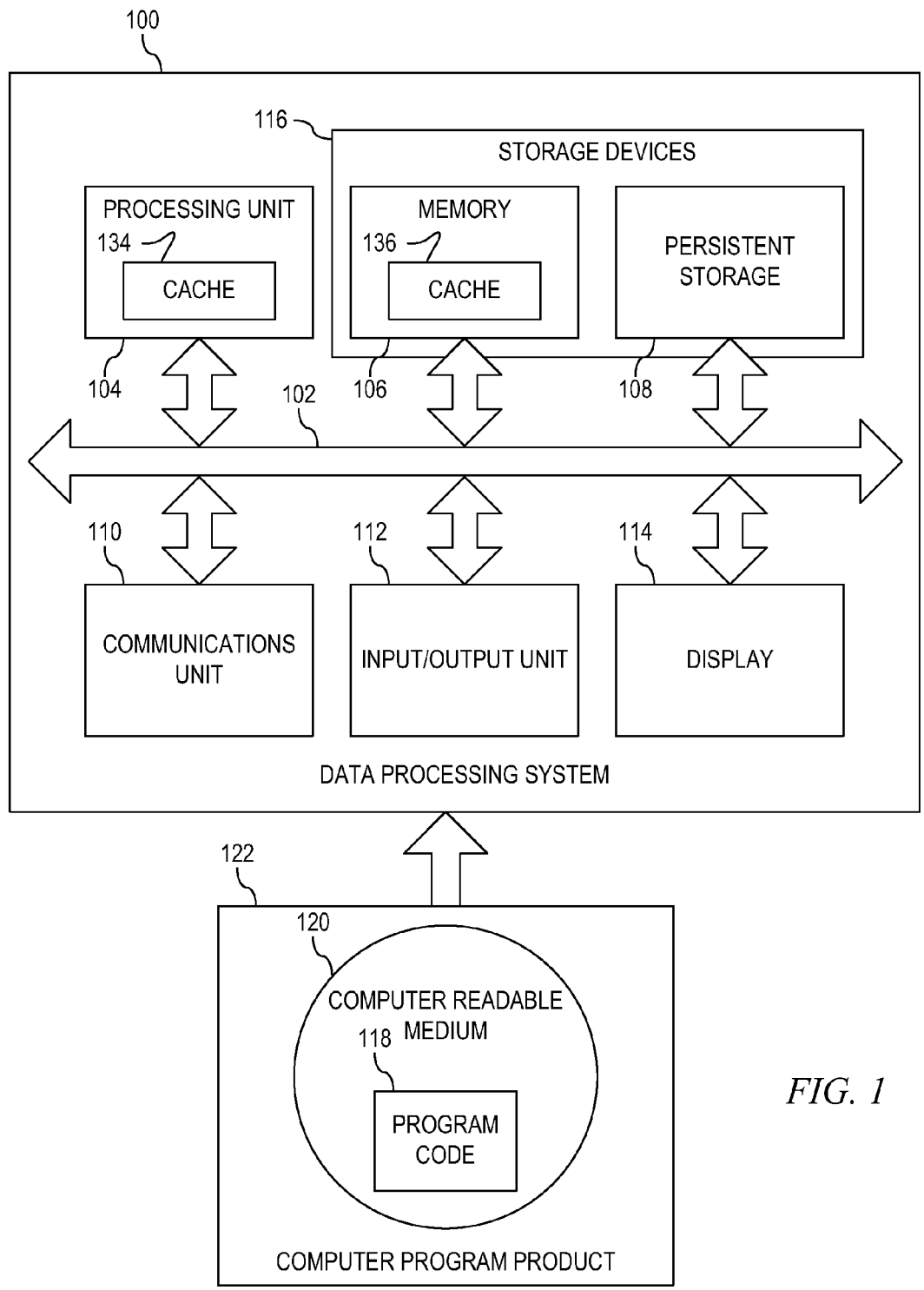
FIG. 1 is a block diagram of a data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation, this is only an example and is not intended to state or imply any limitation with regard to the features of the present invention. To the contrary, the illustrative embodiments are intended to include distributed data processing environments.

With reference now to the figures and in particular with reference to FIGS. 1 and 2, example diagrams of data processing environments are provided in which illustrative embodiments of the present invention may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 is a block diagram of a data processing system in which aspects of the illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory a rewritable optical disk, a rewritable magnetic tape, or some combination of the above. The media used by persistent storage 108 also may be removable. For example, a removable hard drive may be used for persistent storage 108.

Processing unit 104 may have cache 134. Cache 134 may be a level 0 (L0) and/or level 1 (L1) cache. Memory 106 may have cache 136, which may be, for example, a level 2 (L2) cache. Memory 106 may be a shared memory that is shared among a plurality of threads or a plurality of processing units. Therefore, cache 136 may be a shared cache.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable medium 120 that is selectively removable and may be loaded onto or transferred to data processing system 100 for execution by processor unit 104. Program code 118 and computer readable medium 120 form computer program product 122 in these examples. In one example, computer readable medium 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable medium 120 also may take the form of a persistent storage, such as a hard drive, a thumb drive, or a flash memory that is connected to data processing system 100. The tangible form of computer readable medium 120 is also referred to as a computer recordable storage medium. In some instances, computer readable medium 120 may not be removable.

Alternatively, program code 118 may be transferred to data processing system 100 from computer readable medium 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable medium 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

FIG. 2 is an exemplary block diagram of a processor design in which aspects of the illustrative embodiments may be implemented. Processor 200 may be implemented as processing unit 104 in FIG. 1 in the illustrative example. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of-order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 219, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218. FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache. As used herein, the term "cache" refers to a cache memory and associated logic, i.e. the cache controller.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor having a large cache.

Figure 3A:
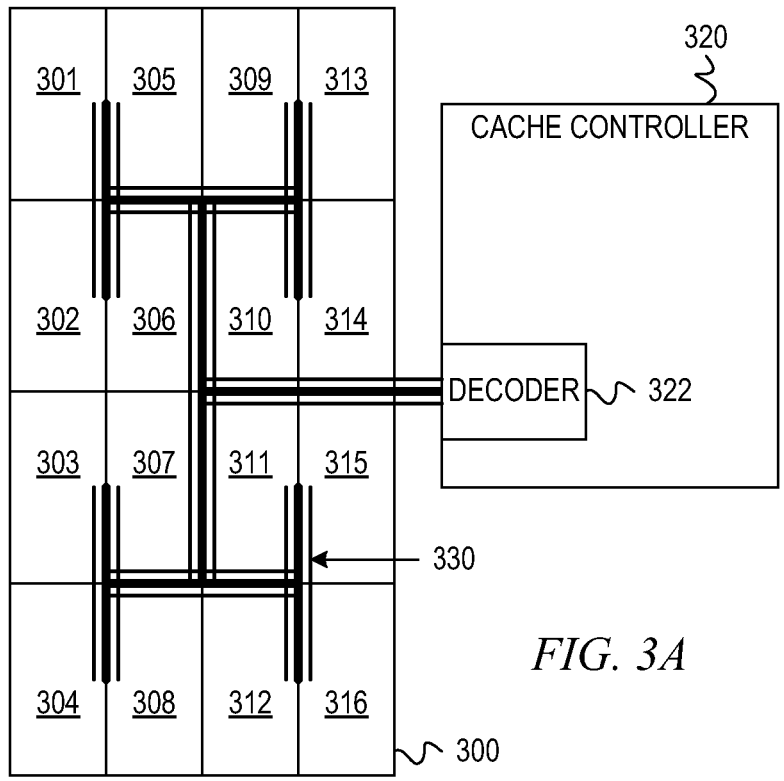
FIGS. 3A and 3B are block diagrams depicting a cache in which aspects of the illustrative embodiments may be implemented.
Figure 3B:
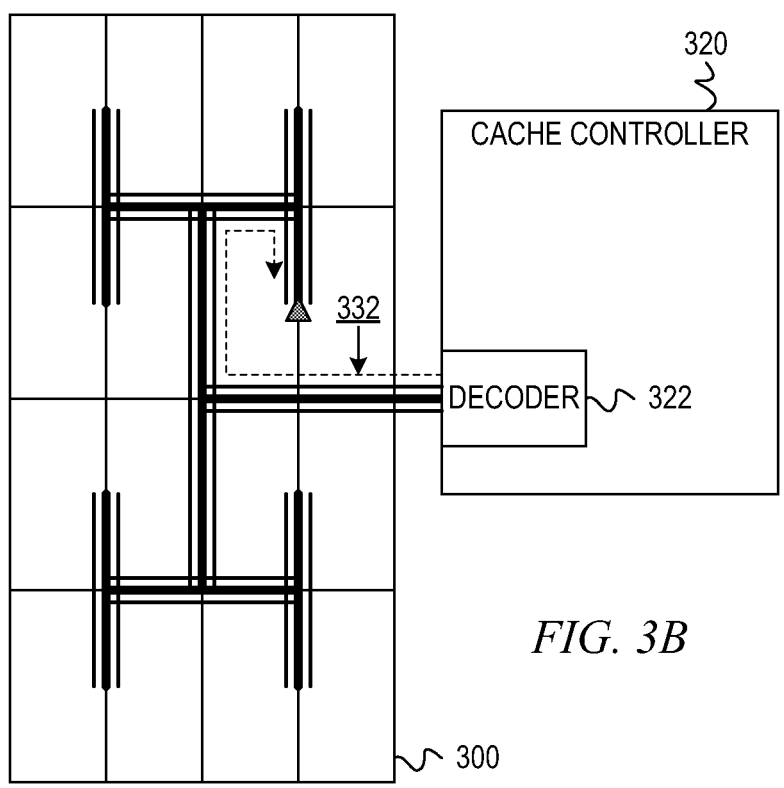

FIGS. 3A and 3B are block diagrams depicting a cache in which aspects of the illustrative embodiments may be implemented. With reference to FIG. 3A, the cache comprises cache array 300 and cache controller 320. Cache array 300 includes cache blocks 301-316. For example, each cache block 301-316 may be a 512 KB block of memory such that cache array 300 represents an 8 MB cache memory. A cache block may also be referred to as a cache bank or tile.

Cache controller 320 includes address decoder 322, which accesses cache blocks 301-316 using a conventional H-tree routing structure 330. Using H-tree routing structure 330, decoder 322 can access each of cache blocks 301-316 using four segments of the routing structure 330. For instance, by illustration purposes only, in FIG. 3A, decoder 322 accesses cache block 304 by traversing left, down, left, down through the segments of routing structure 330. Decoder 322 also accesses cache block 314, which is much closer in physical proximity to cache controller 320 than cache block 304, by traversing left, up, right, down through the segments of routing structure 330.

As illustrated in FIG. 3B, decoder 322 can access cache block 310 or cache block 314 by traversing left, up, right, down through segments of routing structure 330, shown as routing path 332. Thus, even for cache blocks that are close in physical proximity to cache controller 320, the address decoder 322 must traverse four segments of H-tree routing structure 330. In other words, as can be seen in FIG. 3B, access to any cache block has the same access latency regardless of physical proximity to cache controller 320.

Figure 4A:
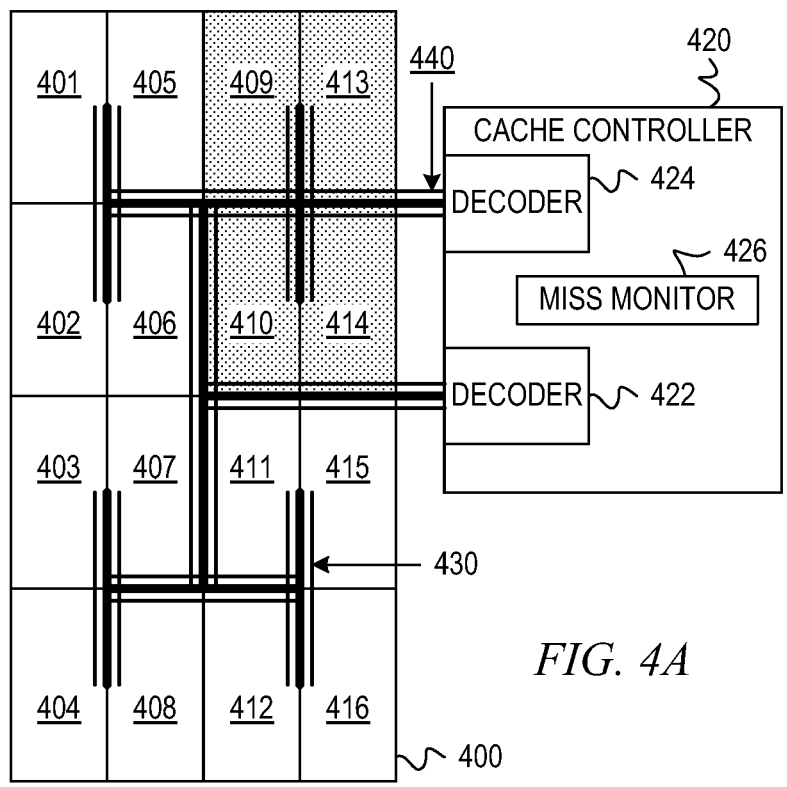
FIGS. 4A and 4B are block diagrams depicting a reconfigurable cache in accordance with an illustrative embodiment.
Figure 4B:
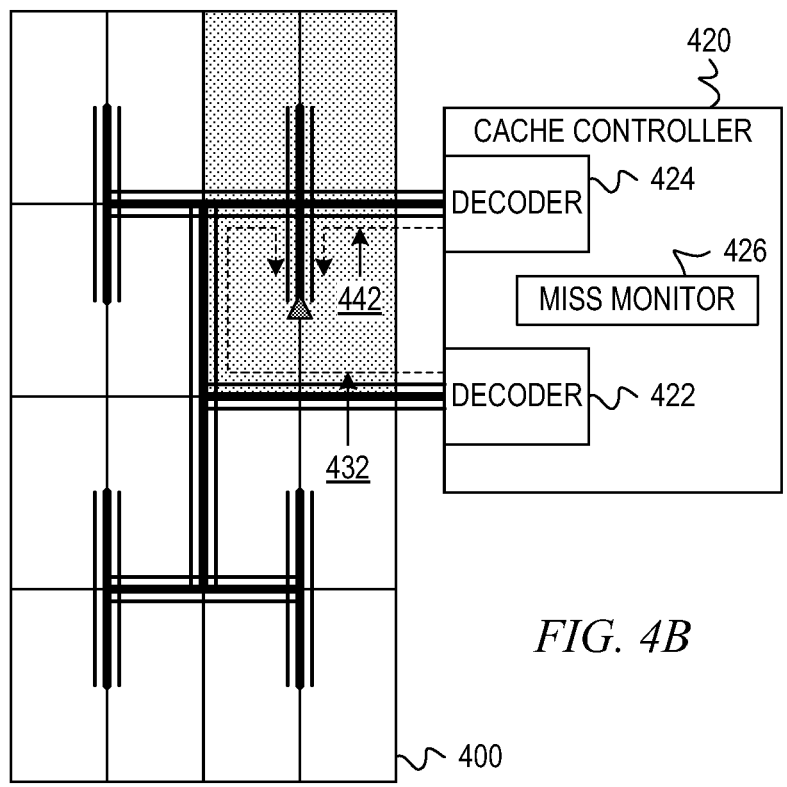

FIGS. 4A and 4B are block diagrams depicting a reconfigurable cache in accordance with an illustrative embodiment. With reference to FIG. 4A, the cache comprises cache array 400 and cache controller 420. Cache array 400 includes cache blocks 401-416. For example, each cache block 401-416 may be a 512 kB block of memory such that cache array 400 represents an 8 MB cache memory. Cache array 400 also includes a small cache partition comprising cache blocks 409, 410, 413, and 414 and a large cache partition comprising cache blocks 401-416, wherein the large cache partition includes the small cache partition.

Cache control ter 420 includes address decoder 422, which accesses the large cache partition, cache blocks 401-416, using a conventional H-tree routing structure 430. Using H-tree routing structure 430, decoder 422 can access each of cache blocks 401-416 using four segments of the routing structure 430. Cache controller 420 also includes address decoder 424, which accesses the small cache partition, cache blocks 409, 410, 413, and 414, using routing structure 440.

As illustrated in FIG. 4B, decoder 422 can access cache block 410 or cache block 414 by traversing left, up, right, down through segments of routing structure 430, shown as path 432. Thus, even for cache blocks that are close in physical proximity to cache controller 420, the address decoder 422 must traverse four segments of H-tree routing structure 430 in path 432. However, decoder 422 is able to access the large partition comprising cache blocks 401-416 through H-tree routing structure 430.

Decoder 424 can access block 409 or block 413 by traversing left and up through routing structure 440. Decoder 424 can access cache block 410 or cache block 414 by traversing left and down through segments of routing structure 440, which is shown as path 442. Therefore, decoder 424 is capable of accessing cache blocks in the small cache partition by traversing only two segments of routing structure 440. This shorter path results in reduced decode, array access, and data return latencies.

In the depicted example, the cache size of the large partition may be a number of power of four sub-arrays. For instance, the small partition comprises four 512 kB cache blocks (2 MB), and the large partition comprises sixteen 512 kB cache blocks (8 MB). However, other partitioning configurations may be used depending upon the implementation.

Cache controller 420 includes miss monitor 426. Miss monitor 426 counts a number of cache misses in the last predetermined number, N, of accesses. Given the count of the number of cache misses and N, miss monitor 426 may determine a miss rate. Miss monitor 426 may empirically use the rule of thumb that miss rate reduces by half when cache size increases by four times.

In accordance with an example embodiment, cache controller 420 may initially populate the small partition, cache blocks 409, 410, 413, and 414, using decoder 424 and routing structure 440. Miss monitor 426 determines whether the cache miss rate exceeds a reconfiguration threshold. If the miss monitor 426 determines that the cache miss rate is too high, cache controller 420 reconfigures to use the large cache partition, cache blocks 401-416, using decoder 422 and routing structure 430. Otherwise, if miss monitor 426 does not determine that the cache miss rate is too high, cache controller 420 continues to use the small cache partition.

When cache controller 420 is configured to use the large partition, miss monitor 426 determines whether the cache miss rate is less than a predetermined threshold. This threshold may be a predetermined constant, may be relative to the above reconfiguration threshold (e.g., half), or may be relative to a recorded miss rate of the small partition (e.g., half). For example, based on the rule of thumb described above, increasing the cache size by four times should result in the miss rate being reduced by half. If using the large cache partition does not result in a sufficient reduction in cache miss rate, the cache controller 420 reconfigures to use the small partition, cache blocks 409, 410, 413, and 414. Otherwise, if using the large cache partition does result in a sufficient reduction in cache miss rate, then cache controller 420 continues to use the large partition.

In one example embodiment, a software compiler may examine program code and determine an appropriate cache size to use for a program or portion of code. The compiler may use a profile or run-time feedback, possibly with hypervisor support, to provide software hints to identify a best cache size to use for the program or for individual portions of code. Cache controller 420 may use software hints to calculate effective cache usage and to adjust cache capacity by reconfiguring between small cache size and large cache size.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
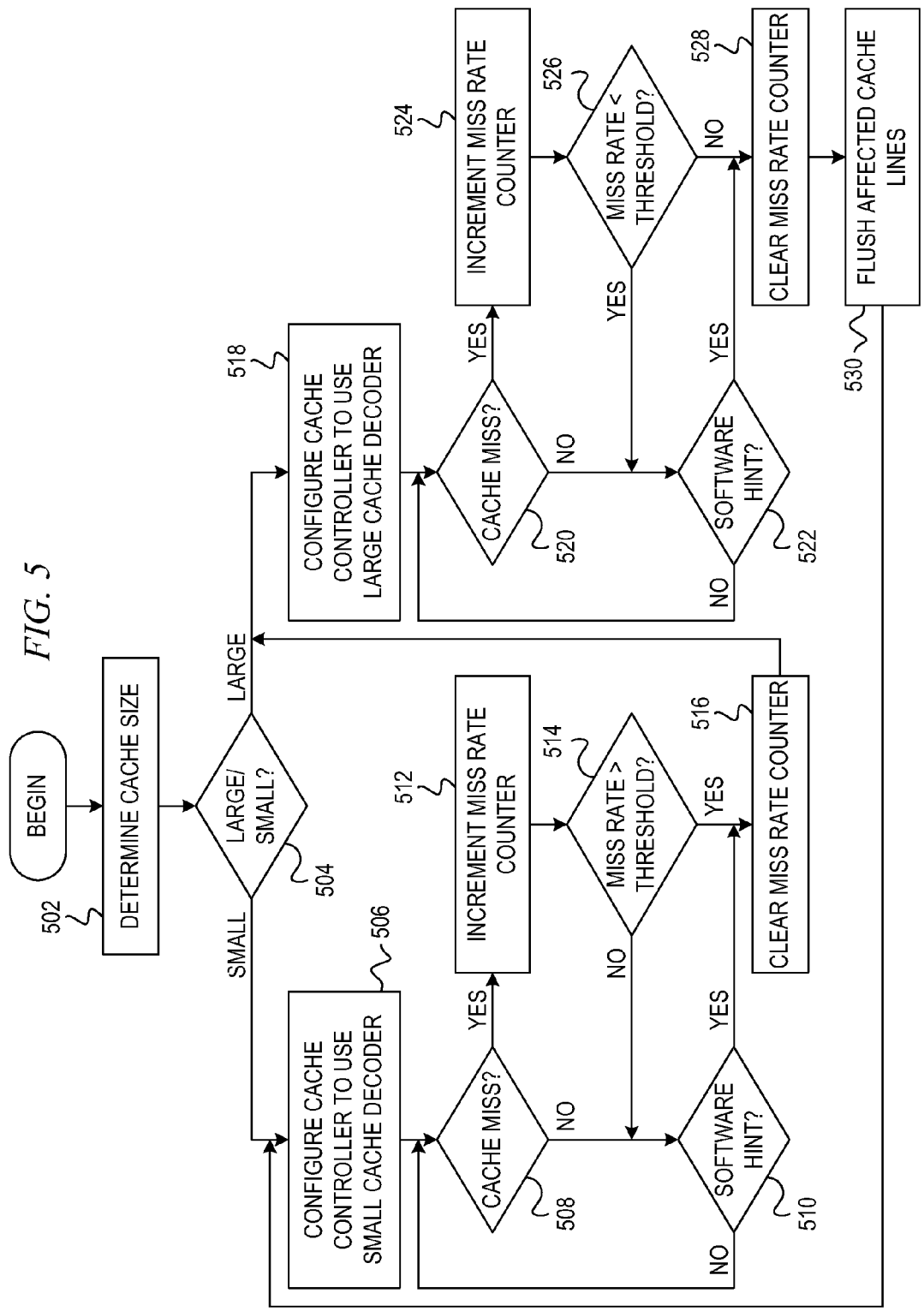
FIG. 5 is a flowchart illustrating operation of a cache controller with reconfigurable cache size in accordance with an illustrative embodiment.

FIG. 5 is a flowchart illustrating operation of a cache controller with reconfigurable cache size in accordance with an illustrative embodiment. Operation begins, and the cache controller determines an initial cache size (block 502). The cache controller may determine the initial cache size by using a default cache size, such as the small cache size, or by receiving a software hint when initiating execution of a software program. The cache controller then determines whether the cache size is large or small (block 504). The illustrative embodiments show an inclusive cache partitioning with a large cache size that includes a small cache size. However, other cache partitioning techniques may be used, such as more than two cache sizes, non-inclusive cache partitions, and the like.

If the initial cache size is small in block 504, the cache controller configures to use the address decoder associated with the small cache size (block 506). In the illustrative embodiments described above, the address decoder associated with the small cache size uses a routing structure to access a sub-array of the large cache partition. The cache controller may then perform cache accesses using the small cache partition, and the cache controller determines whether a cache miss occurs (block 508). If a cache miss does not occur, the cache controller determines whether a software hint is encountered that causes the cache controller to reconfigure the cache (block 510). If the cache controller does not encounter a software hint in block 510, then operation returns to block 508 to determine whether a cache miss occurs.

Returning to block 508, if a cache miss occurs, the cache controller increments a miss rate counter (block 512), and the cache controller determines whether the miss rate is greater than a reconfiguration threshold (block 514). This reconfiguration threshold may have a predetermined value, may be determined based on a software hint from a compiler, or may be determined dynamically. If the miss rate is not greater than the reconfiguration threshold, operation proceeds to block 510 to determine whether the cache controller encounters a software hint that causes the cache controller to reconfigure the cache. If the miss rate is greater than the reconfiguration threshold in block 514, then the cache controller clears the miss rate counter (block 516), and the cache controller reconfigures the cache.

Returning to block 510, if the cache controller encounters a software hint, then operation proceeds to block 516 to clear the miss rate counter.

After clearing the miss rate counter in block 516, or if the cache controller determines that the cache size is large in block 504, the cache controller configures to use the address decoder associated with the large cache size (block 518). In the illustrative embodiments described above, the address decoder associated with the large cache size uses an H-tree routing structure to access the large cache partition. The cache controller may then perform cache accesses using the large cache partition, and the cache controller determines whether a cache miss occurs (block 520). If a cache miss does not occur, the cache controller determines whether a software hint is encountered that causes the cache controller to reconfigure the cache (block 522). If the cache controller does not encounter a software hint in block 522, then operation returns to block 520 to determine whether a cache miss occurs.

Returning to block 520, if a cache miss occurs, the cache controller increments a miss rate counter (block 524), and the cache controller determines whether the miss rate is less than a threshold (block 526). This threshold may have a predetermined value, may be determined based on a software hint from a compiler, may be determined dynamically, may be relative to the reconfiguration threshold in block 514, or may be relative to a recorded miss rate using the small cache partition. If the miss rate is less than the reconfiguration threshold, operation proceeds to block 522 to determine whether the cache controller encounters a software hint that causes the cache controller to reconfigure the cache. If the miss rate is not less than the threshold in block 526, then the cache controller clears the miss rate counter (block 528), flushes the affected cache lines (block 530), and operation returns to block 506 where the cache controller reconfigures the cache to use the small cache size.

Returning to block 522, if the cache controller encounters a software hint, then operation proceeds to block 528 to clear the miss rate counter and flush the affected cache lines (block 530), and operation returns to block 506 where the cache controller reconfigures the cache to use the small cache size.

Thus, the illustrative embodiments provide mechanisms for providing an improved reconfigurable cache. The mechanism partitions a large cache into inclusive cache regions with equal-ratio size increase. For example, the mechanism may partition an 8 MB L3 cache into a 1 MB L3 small cache and an 8 MB L3 large cache, where the 8 MB L3 large cache includes the 1 MB L3 small cache, which is close in physical proximity to the cache controller. The cache controller includes an address decoder for the large cache with a large routing structure. The cache controller includes an additional address decoder for the small cache with a smaller routing structure. The additional address decoder for the small cache reduces decode, array access, and data return latencies.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system for reconfigurable cache size of a cache comprising a plurality of cache blocks, the method comprising:
   configuring a cache controller to use a first address decoder to access a first cache partition having a first size using a first routing structure, wherein the first cache partition comprises a first set of cache blocks, wherein the first set of cache blocks is a subset of the plurality of cache blocks, wherein the address decoder accesses each cache block in the first subset of cache blocks by traversing a first number of segments of the first routing structure; and
   responsive to an event, reconfiguring the cache controller to use a second address decoder to access a second cache partition having a second size using a second routing structure, wherein the second cache partition comprise a second subset of cache blocks, wherein the first set of cache blocks is a subset of the second set of cache blocks, wherein the second address decoder accesses each cache block in the second subset of cache blocks by traversing a second number of segments of the first routing structure, wherein the second number is greater than the first number.

2. The method of claim 1, wherein the second routing structure comprises an H-tree routing structure.

3. The method of claim 1, further comprising:
   monitoring a miss rate, wherein the event comprises the miss rate exceeding a reconfiguration threshold.

4. The method of claim 3, further comprising:
   responsive to the miss rate remaining above a predetermined threshold, reconfiguring the cache controller to use the first address decoder to access the first cache partition.

5. The method of claim 4, wherein reconfiguring the cache controller to use the first address decoder to access the first cache partition comprises flushing affected cache lines from the second cache partition.

6. The method of claim 1, wherein the event comprises a first software hint from a software program.

7. An apparatus for reconfigurable cache size, the apparatus comprising;
   a cache array comprising a plurality of cache blocks, wherein the cache array is partitioned into a first cache partition having a first size and a second cache partition having a second size, wherein the first cache partition comprises a first set of cache blocks, wherein the first set of cache blocks is a subset of cache blocks, wherein the first set of cache blocks is a subset of the second set of cache blocks; and
   a cache controller, wherein the cache controller is configured to use a first address decoder to access the first cache partition using a first routing structure, wherein the first address decoder accesses each cache block in the first subset of cache blocks by traversing a first number of segments of the first routing structure, and responsive to an event, the cache controller is reconfigured to use a second address decoder to access the second cache partition using a second routing structure, wherein the second address decoder accesses each cache block in the second subset of cache blocks by traversing a second number of segments of the first routing structure, wherein the second number is greater than the first number.

8. The apparatus of claim 7, wherein the cache controller is further configured to monitor a miss rate, wherein the event comprises the miss rate exceeding a reconfiguration threshold.

9. The apparatus of claim 8, wherein responsive to the miss rate remaining above a predetermined threshold, the cache controller is reconfigured to use the first address decoder to access the first cache partition.

10. The apparatus of claim 9, wherein reconfiguring the cache controller to use the first address decoder to access the first cache partition comprises flushing affected cache lines from the second cache partition.

11. The apparatus of claim 7, wherein the event comprises a software hint from a software program.

12. The apparatus of claim 7, wherein the second routing structure comprises an H-tree routing structure.

13. A computer program product comprising a non-transitory computer recordable medium having a computer readable program recorded thereon, wherein the computer readable program, when executed on a computing device, causes the computing device to:
   configure a cache controller of a cache comprising a plurality of cache blocks to use a first address decoder to access a first cache partition having a first size using a first routing structure, wherein the first cache partition comprises a first set of cache blocks, wherein the first set of cache blocks is a subset of the plurality of cache blocks, wherein the first address decoder accesses each block in the first subset of cache blocks by traversing a first number of segments of the first routing structure; and
   responsive to an event, reconfigure the cache controller to use a second address decoder to access a second cache partition having a second size using a second routing structure, wherein the second cache partition comprise a second subset of cache blocks, wherein the first set of cache blocks is a subset of the second set of cache blocks, wherein the second address decoder accesses each cache block in the second subset of cache blocks by traversing a second number of segments of the first routing structure, wherein the second number is greater than the first number.

14. The computer program product of claim 13, wherein the computer readable program is stored in a computer readable storage medium in a data processing system and wherein the computer readable program was downloaded over a network from a remote data processing system.

15. The computer program product of claim 13, wherein the computer readable program is stored in a computer readable storage medium in a server data processing system and wherein the computer readable program is downloaded over a network to a remote data processing system for use in a computer readable storage medium with the remote system.

16. The computer program product of claim 13, wherein the second routing structure comprises an H-tree routing structure.

17. The computer program product of claim 13, wherein the computer readable program further causes the computing device to:
monitor a miss rate, wherein the event comprises the miss rate exceeding a reconfiguration threshold.

18. The computer program product of claim 17, wherein the computer readable program further causes the computing device to:
responsive to the miss rate remaining above a predetermined threshold, reconfigure the cache controller to use the first address decoder to access the first cache partition.

19. The computer program product of claim 18, wherein reconfiguring the cache controller to use the first address decoder to access the first cache partition comprises flushing affected cache lines from the second cache partition.

20. The computer program product of claim 13, wherein the event comprises a first software hint from a software program.

\* \* \* \* \*